United States Patent
Heydarpour et al.

[11] Patent Number: 5,911,665
[45] Date of Patent: Jun. 15, 1999

[54] FATIGUE CRACK RESISTANT LIQUID PACKAGING POUCH

[75] Inventors: Ramin Heydarpour, Chicago; Sriram Venkatasanthanam, Wheeling; David Carl Schroeder, Buffalo Grove, all of Ill.

[73] Assignee: Tetra Laval Holdings & Finance SA, Pully, Switzerland

[21] Appl. No.: 08/627,902

[22] Filed: Apr. 3, 1996

[51] Int. Cl.⁶ .............................. A23G 9/04; B32B 27/05; B32B 27/34; B65B 9/08

[52] U.S. Cl. .................. 53/449; 73/812; 73/849; 426/126; 426/127; 428/35.7; 428/36.6; 53/172

[58] Field of Search .............................. 53/455, 449, 450, 53/451, 170, 172; 73/849, 812, 808; 426/127, 126; 428/36.6, 35.7, 35.2, 423.7

[56] References Cited

U.S. PATENT DOCUMENTS

| | | |
|---|---|---|
| 4,503,102 | 3/1985 | Mollison ................................. 428/35 |
| 4,521,437 | 6/1985 | Storms ................................. 428/408 X |
| 4,608,286 | 8/1986 | Motoishi et al. ......................... 428/35 |
| 5,288,531 | 2/1994 | Falla et al. ............................ 428/35.2 |
| 5,302,344 | 4/1994 | Perlman .................................. 53/425 |
| 5,364,486 | 11/1994 | Falla et al. ........................... 156/308.4 |

Primary Examiner—James F. Coan
Attorney, Agent, or Firm—Michael A. Catania

[57] ABSTRACT

A polymeric film and method for overcoming the problem of "pinholes" created in filled pouches by the harmonic motion occurring during transport of the filled pouches. The polymeric film composed of from about 5% to about 95% by weight of a first polymeric material having an elongation at break of more than about 500% in the machine direction and more than about 600% in the transverse direction, and from 5% by weight to about 95% by weight of a second polymeric material having a density of at least about 0.915 g/cm³ and selected from the group consisting of polyethylene and ethylene copolymers. The first polymeric material includes a very low density linear ethylene interpolymerized from ethylene and at least one alpha-olefin in the range of $C_3$–$C_{10}$. The film may be fabricated into pouches and the pouches stacked for transportation.

13 Claims, 8 Drawing Sheets

FATIGUE CRACK RESISTANT LIQUID PACKAGING POUCH

This development relates to heat-sealable polyethylene and ethylene copolymer pouch material used in consumer packaging. This development relates particularly to such pouch material which is fatigue crack-resistant when filled with a liquid and exposed to vibration, as when filled pouches made of such material are transported by truck.

BACKGROUND OF THE INVENTION

The prior art discloses heat-sealable polyethylene film which can be made into disposable pouches for packaging liquids and other flowable materials. These pouches are commonly used as consumer packages for containing milk, particularly shelf-stable sterilized milk. The filled pouches are commonly stacked in a larger outer container, such as an open-topped carrier, crate, or display rack, so each stack is several pouches deep. The carriers can also be stacked. Then the stacked carriers are transported by truck, rail, or some other form of transportation to a store. The ultimate consumer selects individual pouches from the carrier in the store.

A polyethylene pouch as consumer packaging for milk and other liquids has advantages over containers used in the past: glass bottles, paper cartons, and high density polyethylene jugs. Compared to these alternative containers, a polyethylene pouch consumes less raw material, requires less space in a landfill, can be recycled, can be processed easily, requires less storage space, uses less energy for chilling (as when the shelf-stable milk is chilled for the first time by the consumer) because it transfers heat readily, and can be safely incinerated. A polyethylene pouch also can be reused. For example, the empty pouch can be used as a freezer bag, sandwich bag, or as a general purpose storage bag.

A composition containing a very low density linear ethylene material in at least the seal layer of a pouch is disclosed in U.S. Pat. No. 5,364,486, which is incorporated here by reference in its entirety. This material is described in that patent as "comprising (a) from 10 to 100 percent by weight of at least one polymeric seal layer of a very low density linear ethylene copolymer interpolymerized from ethylene and at least one alpha-olefin in the range of $C_3$–$C_{10}$ and having (1) a density of from about 0.89 g/cm$^3$ to less than 0.915 g/cm$^3$, (2) a melt index of less than about 10.0 g/10 minutes and (3) (i) a hot tack or heat seal initiation temperature of less than 100° C. at a force of at least 1N/inch (39.4N/m) or (ii) achieving a hot tack strength of at least 1 N/inch (39.4N/m) at a seal bar temperature of about 110° C. at less than 0.2 seconds using the Hot Tack Strength Method or achieving a heat seal strength of at least 1 lb.f/inch (175N/m) at a seal bar temperature of about 110° C. at less than 0.25 seconds using the Heat Seal Strength Method; and (b) from 0 to 90 percent by weight of at least one polymer selected from the group consisting of a linear copolymer of ethylene and a $C_3$–$C_{18}$-alpha-olefin having a density of greater than 0.916 g/cm$^3$ and a melt index of from 0.1 to 10 g/10 minutes, a high-pressure low density polyethylene having a density of from 0.916 to 0.930 g/cm$^3$ and a melt index of from 0.1 to 10 g/10 minutes and ethylene-vinyl acetate copolymer having a weight ratio of ethylene to vinyl acetate from 2.2:1 to 24:1 and a melt index of from 0.2 to 10 g/10 minutes."

One unresolved problem in the art is the relatively high occurrence of "leakers"—pouches which develop leaks. Leakers are manifested both as the pouches are packed and due to later handling. Leakers which are not discovered and removed at the time of packaging are a particular problem because the pouches are transported in stacks. Liquid which has escaped from a single leaking pouch in a stack can soil the leaking pouch, as well as several or even all of the intact pouches in the stack. If the liquid is sticky (like fruit juices) or subject to spoilage on exposure to air (like shelf-stable milk), the soiled pouches can develop a disagreeable feel or odor. Consumers may avoid buying many stacked pouches which have been soiled by one leaker. It is thus important to minimize the number of pouches which develop leaks on the way to the consumer.

In particular, prior art films made into pouches have a high incidence of defects which develop in the material of the pouch, allowing flowable material such as milk to escape from the pouch.

Leakers have largely been attributed to the film used to make the polyethylene pouches known in the prior art, and particularly its burst strength, puncture strength, and seal strength. Prior efforts to reduce the incidence of material fatigue crack defects have therefore focused on these properties of the film. One important cause of material fatigue crack formation, detailed below as part of the present development, is believed to have escaped the notice of prior investigators.

The M, M(2) and M(1.3) tests are pouch performance tests described in U.S. Pat. No. 4,521,437. These "M" tests are carried out by dropping a sample of filled pouches from a defined height (stated in meters in parentheses: for the M(2) test the height is 2 meters) to determine what percentage of them will break when dropped.

One sealant film disclosed in the prior art has been described as providing pouches with a smaller (better) M-test value than that obtained for prior pouches. More specifically, the pouches have been described as providing an M(1.3)-test value of less than about 5% (breakage) for pouches having a volume of from 0.1 to 1.3 liters.

Although the performance of the prior art films has been satisfactory in many respects, the industry desires a film having better performance, and particularly fewer leakers, when it is fabricated into hermetically sealed pouches containing flowable materials.

SUMMARY OF THE INVENTION

The present development proceeds from an unexpected discovery: many "pinholes" in liquid-filled pouches are material fatigue cracks. Such material fatigue cracks result from extended exposure of the pouch material and contents to harmonic motion, as when the pouches are stacked in containers and transported by truck over a long distance or on uneven roads. These material fatigue cracks typically begin as compact holes, sometimes referred to as "pinholes," which leak fluid from the pouch. A series of compact holes forms along a fold line, then the intervening material gives way to produce a crack. Referring to FIGS. 8 and 9, the illustrated material fatigue cracks have substantially smooth edges and propagate substantially in a straight line, substantially without forming laterally radiating cracks.

The inventors have discovered that these material fatigue cracks generally are not the result of punctures by sharp objects (including the corners of the pouches), bursting caused by the weight of overlying pouches on pouches near the bottom of the stack, handling stresses (such as dropping the pouches) or seal failure. Rather, the material fatigue crack failures result from repeated flexing of the pouch material. This flexing is due to harmonic motion (vibrations or "jiggling") developed in the liquid contained in the pouches when the pouches are vibrated during transport. The problem of harmonic motion is aggravated when the pouches are formed with a gaseous headspace, as they usually are. The presence of an air or other gaseous headspace allows the contained liquid more freedom to slosh about and renders the filled pouch more flexible, and thus more easily bent.

The present inventors have also discovered that the problem of material fatigue cracks developing during transportation of stacked pouches can be reduced by making at least one layer of the pouch wall, such as an inner and/or outer layer of the pouch wall, more resilient (thus more able to flex without material fatigue), rather than making the pouches more puncture resistant or burst resistant or improving their seals. In a three or more layer pouch, an inner or outer layer (and preferably both) which is more resilient than the core layer or layers can markedly improve the problem of leakers when the pouches are to be stacked and extensively exposed to vibration.

One aspect of the development is a polymeric film having an average resin density of less than about 0.918 g/cm$^3$ (resin density of a material as measured herein is the density of the polymer without extraneous additives such as fillers and the like) and including at least first and second polymeric layers. At least one of the polymeric layers includes from about 5% to about 95% by weight of a first polymeric material and from about 5% by weight to about 95% by weight of a second polymeric material.

The first polymeric material has an elongation at break of more than about 500% in the machine direction and more than about 600% in the transverse direction, when measured according to ASTM D-882. The first polymeric material has a density of at most about 0.914.

The second polymeric material has a density of at least about 0.915 g/cm$^3$, and it is selected from the group consisting of polyethylene and ethylene copolymers.

These particular films are particularly adapted for being made into liquid-filled pouches, as stacks of these pouches are more resistant to the formation of leakers during transport than prior, generally similar films.

Another aspect of the present development is a pouch made from the film and packed with a fluid material.

Still another aspect of the development is a method of handling flowable material in pouches which reduces the probability of forming material fatigue cracks in said pouches in the presence of vibration. This method comprises the steps of:

A. providing the film described above;
B. forming the film into individual pouches;
C. packing the pouches with a liquid material; and
D. forming the packed pouches into a stack.

Yet another aspect of the development is a test method for evaluating liquid-filled pouches for leakers, comprising the steps of forming a stack of such pouches in a carrier or other vessel simulating how the pouches will be transported, subjecting the stack to harmonic motion simulating the vibrations which will be experienced during transportation of the carrier, and evaluating the proportion of the pouches which develop leaks as the result of this treatment.

Figure 1:
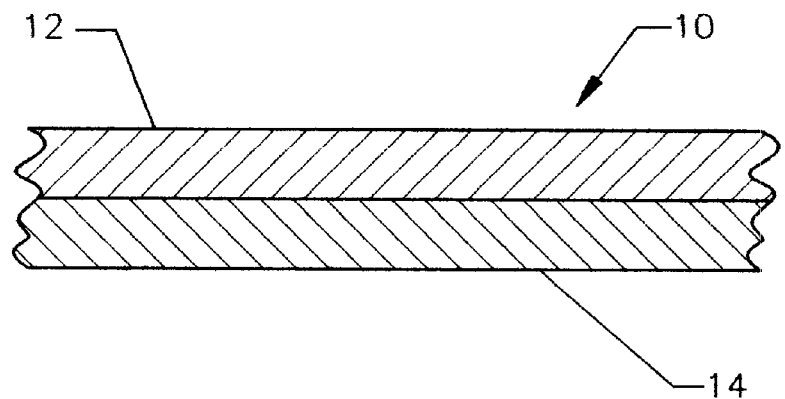
FIG. 1 is a fragmentary section of a two-layer film according to the present development.

The following reference characters are used in the Figures:

10. wall
12. inward facing layer
14. outward-facing layer
16. wall
18. core layer
19. longitudinal seal
20. transverse seal
22. leading fin seal
24. following fin seal
26. filling nozzle
27. filling nozzle
28. fluid charge
34. pouch
38. pouch
40. pouch
42. pouch
44. pouch
46. pouch
48. carrier
50. shingled stack
51. shingled stack
52. pouch
54. pouch
56. pouch
58. pouch Like reference characters are used to identify like or corresponding features throughout the several views.

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

The pouches of the present invention, shown in FIGS. 1–7, are hermetically sealed containers filled with flowable materials, and particularly liquids. "Flowable materials" are defined as solid (particularly granular or more finely divided) or liquid materials which are flowable under gravity or which may be pumped. The flowable materials include aqueous liquids, for example milk, water, or fruit juices; oleaginous liquids, for example, cooking oil or motor oil; emulsions, for example ice cream mix, soft margarine, or mayonnaise; pastes, for example meat pastes and peanut butter; preserves, for example jams, pie fillings, marmalades, and jellies; dough, such as bread dough, cookie dough, or biscuit dough; ground meat, for example sausage meat, ground beef or other meats; greases for cooking, lubrication, and other purposes; powders, for example gelatin powder and powdered detergent compositions; granular solids, for example nuts, grains, and sugar; and many other materials.

The pouch of the present invention is particularly useful for liquid foods, for example milk. Liquids are more subject to the propagation of harmonic motion, which flexes the pouch walls, than other types of material, and readily escape through relatively small holes. Other materials packed in pouches may also, however, contribute to the problem of material fatigue crack generation to varying degrees.

The pouches of the present invention may have various capacities. Generally, the pouches may contain from about 10 milliliters to about 1000 liters of material, alternately from about 50 milliliters to about 100 liters, more commonly from about 100 milliliters to about 50 liters of flowable material.

Figure 2:
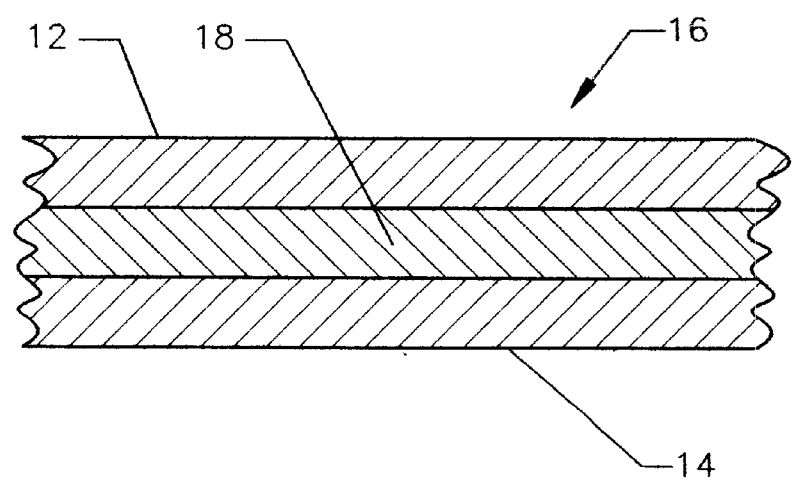
FIG. 2 is a fragmentary section of a three-layer film according to the present development.
Figure 5:
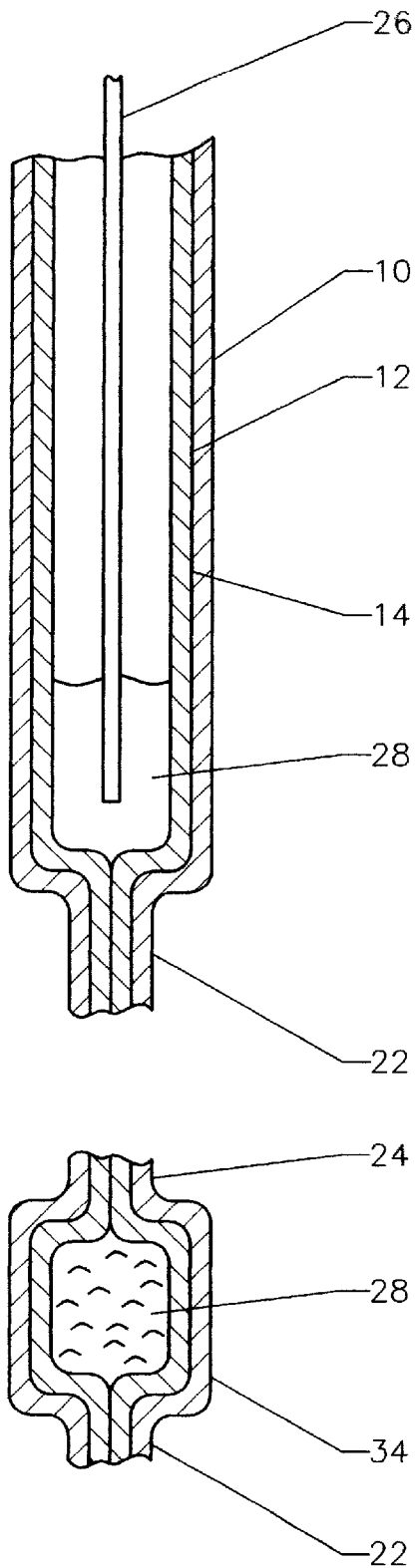
FIG. 5 is a longitudinal section taken along section line 5—5 of FIG. 4, illustrating that the film is a two-layer film and showing the contents of the pouches. The thickness of the pouch wall is greatly exaggerated so the individual layers of the pouch wall can be readily seen.

Referring briefly to FIGS. 1, 2, and 5, the present pouches are fabricated from a film 10 having at least an inward-facing layer 12 and an outward-facing layer 14. Optionally, a three layer film 16 can be used which has one or more core layers 18 between its inward-facing layer 12 and outward-facing layer 14. Pouch wall material including four, five, or more layers is also conventional, and such multilayer films are contemplated for use in the present invention.

The respective layers of the film 10 can be formulated as follows.

Inward-facing Layer

In the embodiment of FIGS. 1–7, the inward-facing layer 12 is a seal layer which can be sealed to itself by applying ultrasonic energy, heat, pressure or combinations of these expedients.

One example of a suitable inward-facing layer 12 is a polyethylene film layer which may contain "very low density polyethylene" ("VLDPE"). For the present purpose, VLDPE is defined as having a density of about 0.915 g/cm$^3$ or less. ATTANE is a trademark for VLDPE commercially available from Dow Plastics, Midland, Mich. The VLDPE of the present invention is generally a linear copolymer of ethylene with at least one alpha-olefin having from 3 to 10 carbon atoms. For example, the VLDPE may be selected from ethylene-1-propylene, ethylene-1-butene, ethylene-1-pentene, ethylene-4-methyl-1-pentene, ethylene-1-hexene, ethylene-1-heptene, ethylene-1-octene copolymers, ethylene-1-decene copolymers, or other such materials.

Generally, the inward-facing layer 12 has a density of less than about 0.915 g/cm$^3$, preferably from about 0.89 to about 0.915 g/cm$^3$; generally has a melt index of less than about 10 g/10 minutes, preferably from about 0.1 to about 10 g/10 minutes; more preferably from about 0.5 about to 5.0 g/10 minutes; and generally has an indicator of molecular weight distribution (I10/I2) of less than about 20, preferably from about 5 to about 20, more preferably from about 6 to about 20 and even more preferably from about 7 to about 18. The thickness of the inward-facing layer 12 may be at least about 0.1 mil (2.5 microns), preferably from about 0.2 mil (5 microns) to about 10 mils (254 microns) and more preferably from 0.4 mil (10 microns) to 5 mils (127 microns).

Such an inward-facing layer 12 has a broad heat sealing range. Generally, the heat sealing range of the film can be from about 70° C. to about 140° C. and preferably from about 75° C. to about 130° C. The resin manufacturer has stated that this type of inward-facing layer 12 has a broader heat seal range than prior art polyethylene film having higher densities. A broad heat sealing range is important to allow for flexibility in the heat sealing process used for making pouches from the film.

Another feature of the inward-facing layer 12 described here is the film's heat seal strength at low temperatures. This property is due in part to the incorporation of EMA (ethylene/methyl acrylate copolymer resin) in the seal layer.

It is proposed by the seller of this material that VLDPE in a film for pouches provides fewer leakers than pouches made with linear low density polyethylene, low density polyethylene or a combination thereof. However, the present invention is not limited to the use of any particular material for layers of the pouch. Any material suitable with the other film materials and having appropriate properties may be used without departing from the present invention.

Another embodiment of the present invention includes a pouch having an inward-facing layer 12 made from a blend of (a) from 10 to 100 percent by weight of at least one linear ethylene copolymer interpolymerized from ethylene and at least one alpha-olefin in the range of $C_3$–$C_{10}$ and having a density of less than about 0.915 g/cm$^3$ and a melt index of less than about 10.0 g/10 minutes, and (b) from 0 to 90 percent by weight of at least one polymer selected from the group consisting of a linear copolymer of ethylene and a $C_3$–$C_{18}$ alpha-olefin having a density of greater than about 0.916 g/cm$^3$ and a melt index of from 0.1 to 10 g/10 minutes, a high-pressure low-density polyethylene having a density of from 0.916 to 0.930 g/cm$^3$ and a melt index of from 0.1 to 10 g/10 minutes and an ethylene-vinyl acetate (EVA) copolymer having a weight ratio of ethylene to vinyl acetate from 22:1 to 24:1 and a melt index of from 0.2 to 20 g/10 minutes.

The inward-facing layer 12 can contain an ethylene/methyl acrylate copolymer ("EMA"), which lowers the sealing temperature required. An exemplary ethylene/methyl acrylate copolymer is LOTRYL 15 MA 03 copolymer, sold by ELF Atochem, Paris, France.

The inward-facing layer 12 may also contain the type of linear low-density polyethylene ("LLDPE"), also defined as a homogeneously branched linear copolyethylene, which is commonly called a "metallocene" or a "polyolefin plastomer." Exemplary metallocene LLDPE's include one having a density of 0.908 g/cm$^3$, sold as AFFINITY PL1840 by Dow Plastics, Midland, Mich., and others sold as EXACT resins by Exxon Chemical Polymers Group. From about 5% by weight to about 95% by weight, alternatively from about 20% to about 80% by weight, of the inward-facing layer can be a first polymeric material having an elongation at break (i.e. ultimate elongation) of more than about 500% in the machine direction, alternatively more than about 600% in the machine direction, alternatively more than about 700% in the machine direction, and more than about 600% in the transverse direction, measured according to ASTM D-882. Several examples of such material are a very-low density polyethylene modified with higher olefins (such as Dow ATTANE $C_8$-LLDPE or ESCORENE 1001 $C_4$LLDPE), a metallocene or homogeneously branched linear copolyethylene, such as those sold by EXXON, a styrene-butadiene elastomer such as KRATON elastomer (sold by Shell Chemical Co.), polybutylene rubber, or other such materials or combinations thereof. A first polymeric material having a density of at most about 0.914 g/cm$^3$, optionally at most about 0.912 g/cm$^3$, optionally less than about 0.912 g/cm$^3$, is contemplated for the present use.

From 5% by weight to about 95% by weight of the inward-facing layer preferably is a second polymeric material having a density of at least 0.915 g/cm$^3$ and selected from the group consisting of polyethylene and ethylene copolymers. An example of this material is low-density polyethylene ("LDPE"). This component is an optional ingredient, though its use makes the film as a whole less expensive.

The inward-facing layer 12 may desirably contain a pigment. An exemplary pigment is titanium dioxide, optionally provided as a masterbatch by dispersing it in high pressure low-density polyethylene ("LDPE"). The LDPE generally has a density of from about 0.916 to about 0.930 g/cm$^3$ and has a melt index of from about 0.1 to about 10 g/10 minutes. A suitable masterbatch is POLYBATCH 8000 ST, sold by A. Schulman Inc., Akron, Ohio.

Many suitable additives are known to those skilled in the art, such as anti-block agents, slip additives, UV stabilizers, pigments, antioxidants, and processing aids. These or other additives may be added to the inward-facing layer 12 as well. An exemplary anti-block agent is SPECTRATECH CM10578 additive concentrate, sold by Quantum Chemical Co., Cincinnati, Ohio. An exemplary antioxidant is POLYBATCH AO-25-A, available from A. Schulman Inc., Akron, Ohio.

The inward-facing layer may be the first or second polymeric layer (or neither), and alternatively can be made of the material specified below for the outer or core layers without departing from the scope of the present invention.

Core Layer

The present inventors optionally contemplate including one or more core layers 18 in the present films.

The core layer 18 may be, or contain, a linear low-density polyethylene ("LLDPE") film layer. For the present purposes, LLDPE is defined as having a density range of from about 0.915 to about 0.939, and as containing from about 5 to about 10% by weight of a $C_4$ or higher alkyl comonomer. Several examples of such material are DOWLEX TM 2045 resin, sold by Dow Plastics; ESCORENE LL-1001 resin, sold by Exxon Chemical Polymers Group; or FLEXIRENE CL-10 resin, sold by Enichem. The LLDPE for the core layer may have a higher density than the outer layer 14.

Another useful component for the core layer is a higher density polyethylene, such as medium-density polyethylene ("MDPE"). For the present purposes, MDPE is defined as having a density range of from about 0.930 to about 0.950. Exemplary medium-density polyethylene is MARLEX HHM TR-130 polyethylene, available from PhillCompany, Bart Company, Bartlesville, Okla. Blending MDPE with LLDPE raises the density of the composition and lowers its cost.

Another useful core layer is LDPE. An exemplary LDPE is PETROTHENE NA 358 polyethylene, available from Quantum Chemical Co., Cincinnati, Ohio.

Still another embodiment of the core layer is a layer of an EVA copolymer having a weight ratio of ethylene to vinyl acetate from 22:1 to 24:1 and a melt index of from 0.2 to 20 g/10 minutes.

Other core materials and additives are known to those skilled in the art. Relevant additives include slip additives, UV stabilizers, antioxidants, pigments and processing aids, as previously identified. These or other materials or additives in any amount which does not destroy the utility of the composition as pouch wall material may be added to the core layer as well. For example, carbon black may be added to the core layer to increase the opacity of the film, preventing exposure of the contents of the pouch to light—particularly ultraviolet light. A representative carbon black formulation is POLYBLAK 3165, sold by A. Schulman Inc. As with the inward-facing layer 12, it may be convenient to use a masterbatch of the pigment in low-density or other polyethylene. An exemplary masterbatch is POLYBATCH 1423, sold by A. Schulman Inc., Akron, Ohio.

The core layer 18 may also be, or incorporate, a moisture, light, oxygen, or food-component (such as oil) barrier, without departing from the scope of the present invention. Representative barrier film materials include polyester, nylon, EVOH, polyvinylidene dichloride (PVDC) resins such as SARAN resin (sold by The Dow Chemical Co., Midland, Mich.) and metallized (e.g. aluminized) films.

Broadly, the core layer may have any thickness so long as the inward-facing layer 12 has a minimum thickness of about 0.1 mil (2.5 microns). Preferably, however, the aggregate of all the core layers has a thickness between about 5 and about 150 microns, alternatively between about 10 and about 80 microns, alternatively between about 20 and about 40 microns.

The core layer may be the first or second polymeric layer (or neither), and alternatively can be made of the material specified above or below for the outer or inner layers without departing from the scope of the present invention.

Outer Polymeric Layer

The outer polymeric layer 14 can be, for example, a print layer (i.e. a substrate for receiving printing), an outer layer of an unprinted container, the printing itself, a topcoat over printing, etc. The outer polymeric layer 14 preferably contains at least first and second polymeric materials.

From about 5% by weight to about 95% by weight, alternatively from about 20% to about 80% by weight, of the outer layer can be a first polymeric material having an elongation at break (i.e. ultimate elongation) of more than about 500% in the machine direction, alternatively more than about 600% in the machine direction, alternatively more than about 700% in the machine direction, and more than about 600% in the transverse direction, measured according to ASTM D-882. Several examples of such material are a very-low density polyethylene modified with higher olefins (such as Dow ATTANE $C_8$-LLDPE or ESCORENE 1001 $C_4$LLDPE), a metallocene or homogeneously branched linear copolyethylene, such as those sold by EXXON, a styrene-butadiene elastomer such as KRATON elastomer (sold by Shell Chemical Co.), polybutylene rubber, or other such materials or combinations thereof. A first polymeric material having a density less than about 0.914 g/cm$^3$ is contemplated for the present use.

From 5% by weight to about 95% by weight of the outer layer preferably is a second polymeric material having a density of at least 0.915 g/cm$^3$ and selected from the group consisting of polyethylene and ethylene copolymers. An example of this material is low-density polyethylene ("LDPE"). This component is an optional ingredient, though its use makes the film as a whole less expensive.

Other additives are known to those skilled in the art, such as anti-block agents, slip additives, UV stabilizers, antioxidants pigments and processing aids. Such materials may be added to the print layer as well. For example, titanium dioxide, optionally masterbatched in polyethylene as previously described, can be used to impart a white, opaque film color suitable as a background for printing.

The outer layer may be the first or second polymeric layer (or neither), and alternatively can be made of the material specified above for the inner or core layers without departing from the scope of the present invention.

Complete Film

The thickness of the complete film used for making the pouch of the present invention is from about 0.5 mil (12.7 microns) to about 8 mils (254 microns), preferably from about 1 mil (25.4 microns) to about 5 mils (127 microns); more preferably from about 2 mils (50.8 microns) to about 4 mils (100 microns).

As can be seen from the different embodiments of the present invention, the film for the pouches of the present invention has design flexibility. Different materials can be used in the inward-facing, outward-facing, and core layers 12, 14, and 18 to optimize specific film properties such as film stiffness and elongation for the second polymeric layer 14. Thus, the film can be optimized for specific applications.

Film Fabrication

As will be understood by those skilled in the art, the multilayer film such as 10 or 16 can be a coextruded film, a coated film (where the inward-facing layer 12, the outward-facing layer 14, or both are coated on a substrate), a laminated film, or a combination of these. Adhesives may optionally be used to join any two contiguous layers. The production of such films in a variety of ways is within the ordinary level of skill in this field.

The film can be made by the blown extrusion method or the cast extrusion method, two exemplary methods well known in the art. The blown extrusion method is described, for example, in Modern Plastics Mid-October 1989 Encyclopedia Issue, Volume 66, Number 11, pages 264 to 266. The cast extrusion method is described, for example, in Modern Plastics Mid-October 1989 Encyclopedia Issue, Volume 66, Number 11, pages 256 to 257.

The blown extrusion film can either be used as extruded (in tubular form) or slit before use to form a flat ribbon. Alternatively, the film can be formed as a flat film.

Exemplary Film Properties And Testing

Many properties are commonly measured and regulated to provide pouch material which is suitable for containing liquids or other flowable materials. Several of these properties are discussed below.

Stiffness (Secant Modulus)

The 1% and 2% secant modulus properties of the films are measures of film stiffness. The stiffness of the films can be measured according to the method of ASTM-D882.

A specific amount of stiffness in a film is required for use of the film for producing pouches. If the film is too stiff, the film will not bend properly for the sealing of longitudinal edges. It could also crease undesirably when pulled over the parts of a pouch-forming machine. Excessive stiffness can also cause the film to hang up in the machine.

On the other hand, if the film is too flimsy, the film may become "bunched" in the corners of the pouch-forming unit. Also, a flimsy pouch may not function properly. For example, a consumer commonly places a pouch of milk in an open-topped support container (resembling a pitcher) which holds the pouch upright with approximately 2½ inches (6 cm) to 3½ inches (9 cm) of the top of the pouch remaining above the rim of the container. To open the pouch, the consumer cuts the corner of the container with a pair of scissors or rips it off. If the film does not have enough stiffness (or wall strength), the film wall could collapse while the consumer tips the container to pour the liquid from the pouch.

The films for the pouches of the present invention advantageously have precisely controlled stiffness, measured according to ASTM D-882. Generally, the stiffness of the film of the present invention is from about 100 MPa in the machine direction (MD)/100 MPa cross direction (CD) to about 200 MPa MD/200 MPa CD and preferably from about 150 MPa MD/150 MPa CD to about 200 MPa MD/200 MPa CD.

Advantageously, the stiffness of the film can be regulated by selecting the proper film materials. By varying the amount of the higher density resin, for example LLDPE having a density of 0.926, used in the core layer of the coextruded films, the stiffness of the film can be altered. For example, a film sample can have a MD 1% secant value of 150–200 MPa.

Tensile Testing (Elongation)

Elongation at break is one of the properties distinguishing the present films and their constituent materials from prior pouch material. The first polymeric materials useful herein have an elongation as defined previously. The complete film contemplated herein can have an elongation of at least about 400%, alternatively at least about 500%, alternatively at least about 600% at break.

Hot Tack Strength

The hot tack strength of a film is the force required to separate a heat seal before the seal has had a chance to fully cool (crystallize). The hot tack strength of the films can be measured using the Hot Tack Test Method. This method simulates the filling of material into a pouch before the bottom transverse seal has had a chance to cool.

The Hot Tack Test Method can be carried out using a Hot Tack Tester Model #52F according to the following conditions:

Specimen Width: 25.4 mm
Sealing Time: 0.5 seconds
Sealing Pressure: 0.28N/mm$^2$
Delay Time: 0.1 seconds
Peel Speed: 200 mm/second
Number of Samples/Temperature: 5
Temperature Increments: 10° C.
Temperature Range: 70° C.–130° C.

The "Hot Tack Seal Initiation Temperature" ("Hot Tack $T_i$") is the lowest temperature at which a seal is formed. A seal force of 1.6 N may be selected as the force required to form an adequate seal, and therefore, Hot Tack $T_i$ is found at a force of 1.6 N.

A low Hot Tack $T_i$ and a broad heat seal range are important for pouch packaging. A low initiation temperature and a broad heat seal range allow the machine to run at faster line speeds by allowing the sealing jaws of the machine to close for short periods of time while still obtaining an adequate heat seal.

3-layer and 2-layer coextruded films with an VLDPE in the sealing layer are expected to have a high hot tack strength at a low temperature.

The temperature between Hot Tack $T_i$ and the temperature of maximum Hot Tack Strength indicates the size of the hot tack sealing range. Films with VLDPE as the sealing layer may have a much larger sealing range than LLDPE and/or LLDPE/LDPE blend films, according to their manufacturers.

The seal strength of the film samples is determined using an MTS SINTECH # 1/D Universal Tester according to the following test conditions:

Direction of Pull: 900 to seal
Crosshead Speed: 20 inches/minute (508 mm/minute)
Full Scale Load: 5 kg
Number of Samples: 5
Break Criterion: 80 percent
Gauge Length: 2.0 inches (50.8 millimeters)
Sample Width: 1.0 inch (25.4 millimeters)

The coextruded films were tested inside/inside, though they also could be tested or used with an inside/outside or lap seal.

A low Heat Seal $T_i$ and a broad heat seal range is important for pouch packaging. A low initiation temperature and a broad heat seal range allow the machine to run at faster line speeds by allowing the sealing jaws of the machine to close for short periods of time while still obtaining an adequate heat seal. The seal strength is determined using an MTS Universal Tester. The film samples are exposed to a relative humidity of 50 percent and a temperature of 23° C. for a minimum of 24 hours prior to testing.

The following are examples of suitable test conditions:

Direction of Pull: 90° to seal
Crosshead Speed: 20 inches/minute (508 mm/minute)
Full Scale Load: 5 kg
Threshold: 1 percent of FSL
Break Criterion: 80 percent
Gauge Length: 2.0 inches (50.8 mm)
Sample Width: 1.0 inch (25.4 mm)

The use of EMA in the sealing layer of a film of the present invention is believed to significantly increase the heat seal and hot tack range. The wider ranges of heat seal and hot tack may allow for faster line speeds on a VFFS unit.

Pouch Fabrication

Machinery for forming and filling pouches is available from TetraPak Flexible Packaging Systems, Lincolnshire, Ill., under the trademarks PRIVILEGE and ADVANTAGE. Vertical form, fill and seal ("VFFS") machines are described in some detail in U.S. Pat. No. 5,288,531 and F. C. Lewis, "Form-Fill-Seal," Packaging Encyclopedia, page 180, 1980, which are incorporated here by reference in their entirety.

In a VFFS packaging process, a sheet of the plastic film described here can be fed into a VFFS machine where the sheet is formed into a continuous tube in a tube-forming section. Next, the transverse seals are formed and the pouch is filled and severed. The process of making a pouch with a VFFS machine is generally described in U.S. Pat. Nos. 4,503,102 and 4,521,437 incorporated herein by reference.

FIGS. 1 through 7 show how pouches are fabricated, filled, and packed according to the present invention.

If the film is supplied flat, it first is folded longitudinally in half, so the layer 14 is on the inside. A longitudinally running fin seal 19 is formed by sealing the facing side edges of the layer 14 together, providing a tube. The tube is formed adjacent to the station where the pouch is filled to facilitate the routing of supply lines (not shown) for the filler tubes 26 and 27 to the interior of the film tube upstream of the point where the fin seal 19 is formed.

Figure 3:
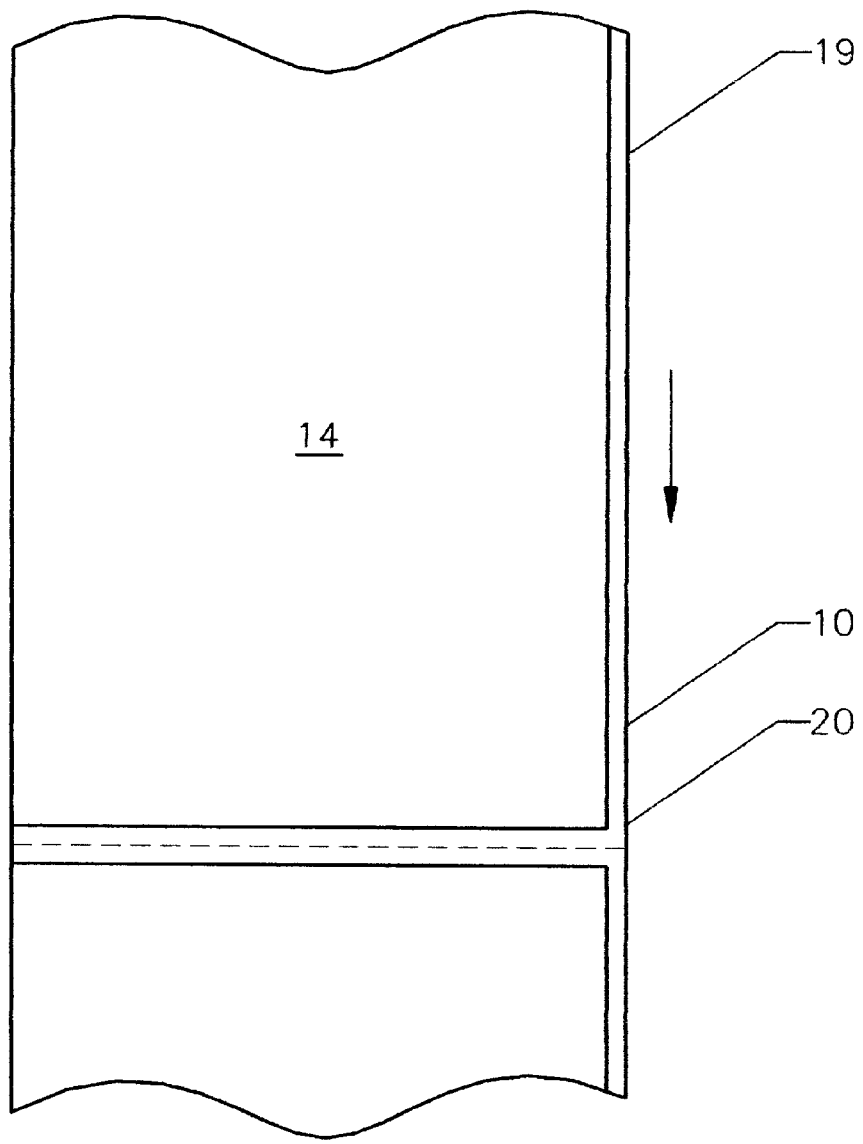
FIG. 3 is a side elevation of a length of film according to the present development, formed into a tube including one longitudinal seam forming the tube and one transverse seal separating two consecutive pouches.

Referring to FIG. 3, a supply of the directly-extruded or fabricated tubular film 10 is fed longitudinally, and usually downward, in the direction of the arrow in FIG. 3. Sections of the tubular film are filled, sealed, severed, and advanced to form and separate filled pouches.

Figure 4:
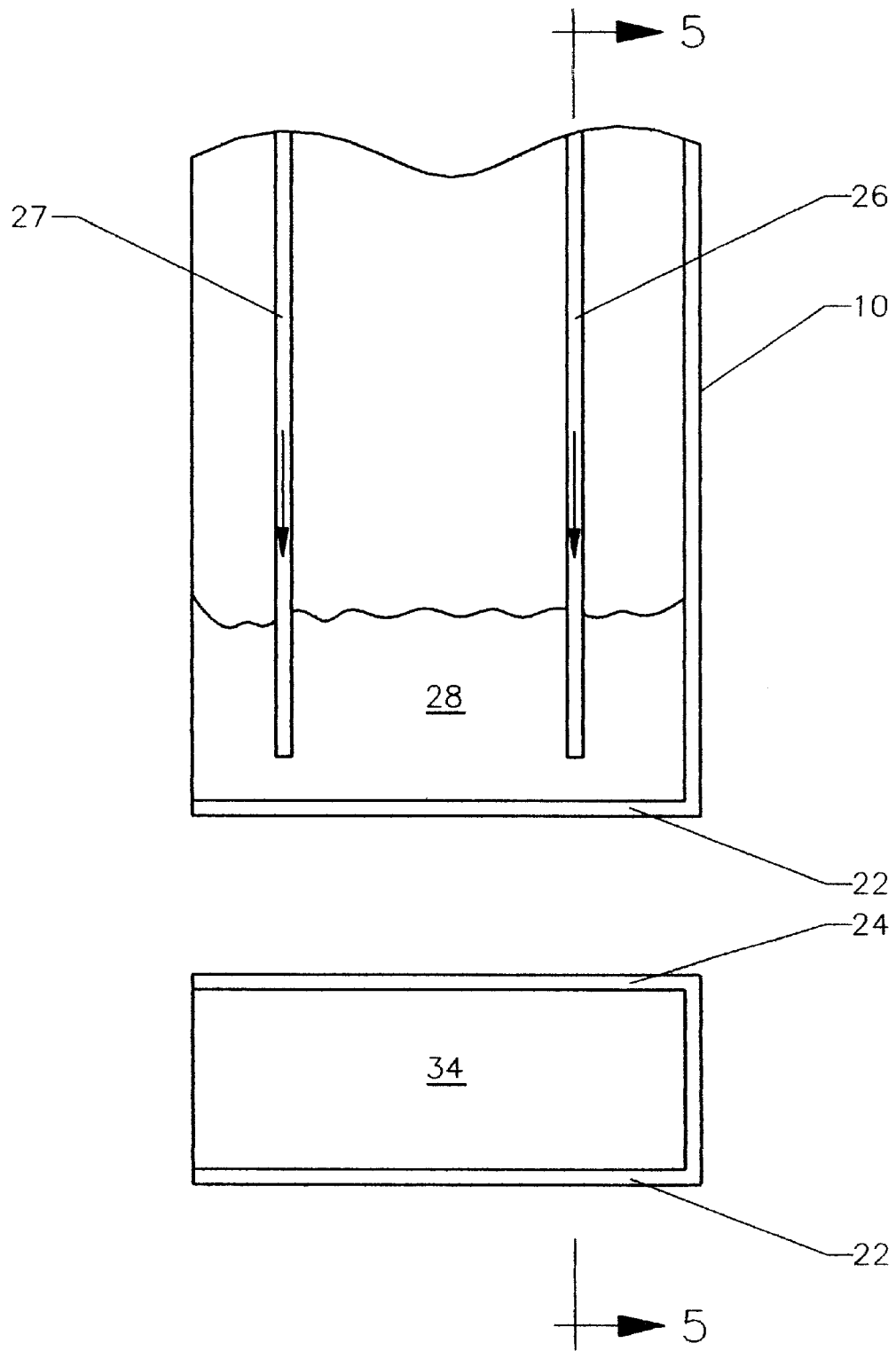
FIG. 4 is a cutaway view similar to FIG. 3, showing a first complete pouch severed from the film and a second, partially formed pouch which is being filled with a fluid product.

Referring to FIGS. 3 and 4, a transverse seal is formed on a leading (lower) part of the tubular film 10 by collapsing the section 20 of the tubular film 10 flat and heat-sealing its facing surfaces together from the outside, so the section 20 becomes a seal. The seal 20 is severed transversely, preferably at the same time as the seal 20 is formed, to form separate leading fin seals 22 and following fin seals 24, shown in FIGS. 4 and 5.

Next, with reference to FIGS. 4 and 5, the portion of the tubular film 10 immediately upstream of the fin seal 22 is filled from a pair of filling nozzles 26 and 27 with a uniform charge 28 of the fluid or other material to be packed. Additional transverse fin seals like 22 and 24 are formed immediately upstream of the charge 28, and another completed, severed pouch identical to the pouch 34 is released. This filling, sealing, and severing cycle is repeated to provide the desired number of pouches.

Stacking The Pouches

Figure 6:
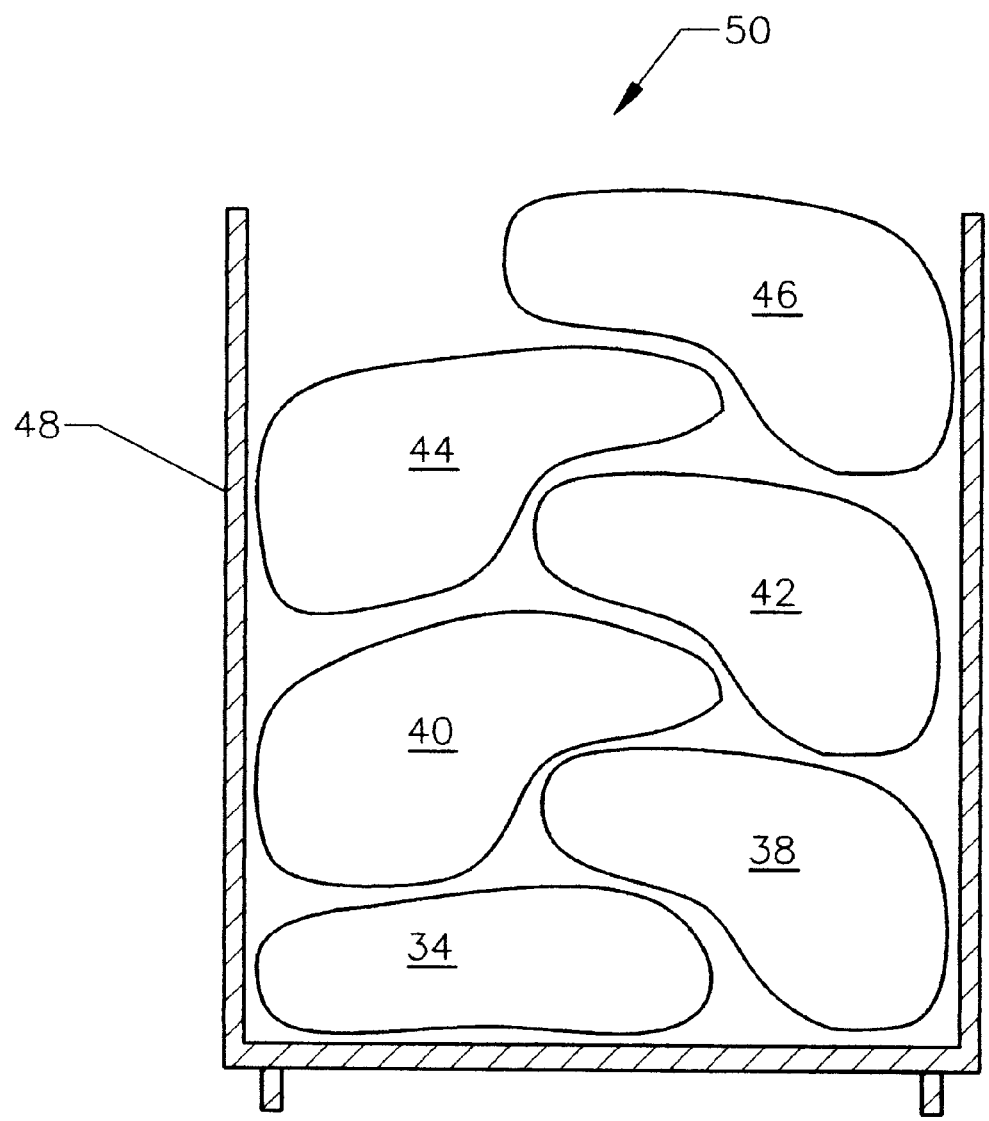
FIG. 6 is a diagrammatic cutaway side elevation of the two shingled stacks of filled pouches contained in an open-topped transportation carrier. Only the foremost stack is visible in FIG. 6.
Figure 7:
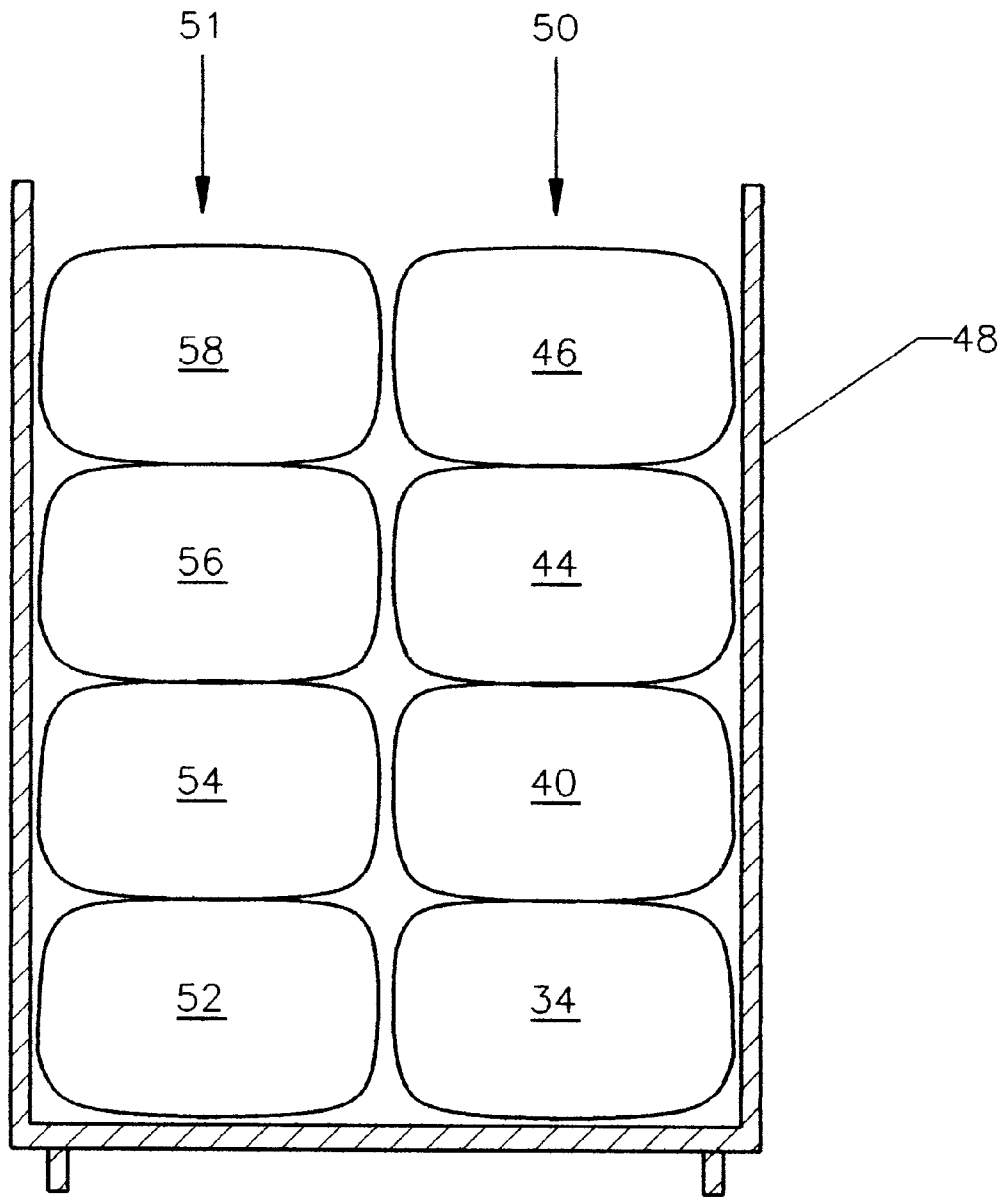
FIG. 7 is a diagrammatic cutaway front elevation of the transportation carrier of FIG. 6, showing both shingled stacks of filled pouches.

The pillow-shaped pouches such as 34, 38, 40, 42, 44, and 46 are then stacked as shown in FIG. 6 within the confines of a carrier 48, defining a stack generally indicated as 50. Commonly, the stack 50 is formed by sequentially dropping a predetermined number of the pouches 34 and 38–46 vertically into the carrier 48. The sequential pouches of the stack can be staggered or shingled, as illustrated, to more completely fill the carrier, or they can simply be stacked in vertical registration. Beside the shingled stack 50, another shingled stack 51 can be formed by stacking additional pouches such as 52, 54, 56, and 58.

Transporting the Pouches

The carriers 48 containing stacked pouches are commonly formed into pallet loads which are then stacked in the cargo hold of a transporting vehicle or vessel, such as a railroad car, a truck, a ship, or the like. Particularly when transported by trucks on rough roads or long journeys, the pouches are regularly subject to substantial harmonic motion.

Pouch Properties and Testing

Pouches fail or become leakers at various points in the production process. Some pouches will leak already when they complete the packaging process. Naturally, such leakage, known here as the "failure rate as packed," should be minimized to avoid wasting the packaged product and soiling the packaging machinery and other pouches. The pouches of the present invention desirably have a failure rate as packed of less than about 1%, more preferably less than about 0.5%, more preferably less than about 0.1%, still more preferably less than about 0.01%.

After the packaging operation is complete, the pouches may fail due to storage or handling. Handling subjects the pouch to many kinds of use and abuse. These include stresses created by dropping the pouch, dropping or stacking additional pouches or other objects onto the pouch, picking the pouch up from one end and poking it with fingers or other objects, etc. Performance tests such as burst testing, puncture testing, dart drop testing, Elmendorf tear testing and tensile testing are intended to duplicate these types of handling that the pouches would encounter during normal use or abuse.

A burst test can be carried out by inflating a series of pouches under standard conditions and measuring the average pressure required to burst the pouch on a MOCON SKYE 2000 machine, sold by Modern Controls, Inc., Minneapolis, Minn.

To carry out the burst test, test packages which have been sealed on all four sides are provided. A sealing septum is adhered to a dry, smooth location on the package being tested. An inflation needle is inserted into the package through the hole in the sealing septum. The package is installed in the package fixture.

For accurate and repeatable results in rupture tests, the air supply pressure is set to 5 psi. above the approximate pressure at which the test package will rupture, not to exceed 35 psi. For example: the first time a rupture test is conducted on a package, the supply pressure is set to 35 psi. If the package ruptures at 10 psi, the supply pressure is changed to 15 psi. Once the test is started, the package inflates. When the package ruptures, the system shuts off the air supply and terminates the test. The air pressure at which the package bursts is calculated and reported as the result.

One performance test which has proven useful is the Tainer Test. The Tainer Test is carried out by loading 140 one-liter pouches into a TETRA TAINER pouch-shipping container, and storing the Tainer for eight hours. This storage time allows the seals to fully crystallize and any leakage to become apparent.

Another test of the capacity of pouches to accept loads is a tightness test which is carried out by pressing a pouch at a pressure of 2.2 Bar for approximately eight seconds. This test is carried out using a Tightness Tester sold by TetraPak Flexible Packaging Systems, Lincolnshire, Ill., as Part No. C53303-010V.

Two types of pouch drop tests can be used to measure the ability of the present pouches to withstand handling and abuse: the 1.5-Meter Drop Test and the Step Stair Drop Test.

In the 1.5-Meter Drop Test, pouches are dropped flat (i.e. with the seals disposed in a horizontal plane) from a height of about 5 feet (1.5 m). This test is more stringent than drop tests reported elsewhere, in which the pouch is dropped "end-on," so it lands directly on one of its seals. Any leak is classified as a failure; the failure rate is reported. When tested using the 1.5-Meter Drop Test, and preferably the present, stringent test in which the pouches are dropped flat, the pouches of the present invention preferably have a failure rate of less than about 10 percent, preferably less than about 7 percent, and progressively more preferable as it drops to less than about 5%, 2%, 1%, or less.

In the Step Stair Drop Test, the pouches are also dropped flat from varying heights to determine the "50% failure height" of a pouch. The "50% failure height" means the height at which 50 percent of the pouches dropped will fail (leak). A higher 50% failure height indicates better performance. When tested using the Step Stair Drop Test, the pouches preferably have a 50% failure height of at least about 2.5 m., preferably at least about 3 m., more preferably at least about 3.5 m.

The inventors have discovered such packaging having a Standardized Transport Test failure rate of less than about 38%, preferably less than about 33%, preferably less than about 27%, and a failure rate in a Double-Stack Transport Test of 18% or less, preferably 15% or less, more preferably 7% or less.

Pouch Failure Mode

The present inventors have observed that at least some pouches made according to the present invention can be distinguished from other pouches by the way in which they fail when subjected to truck transportation or a simulation of truck transportation such as the Standardized Transport Test or the Double-Stack Transport Test described below.

Figure 8:
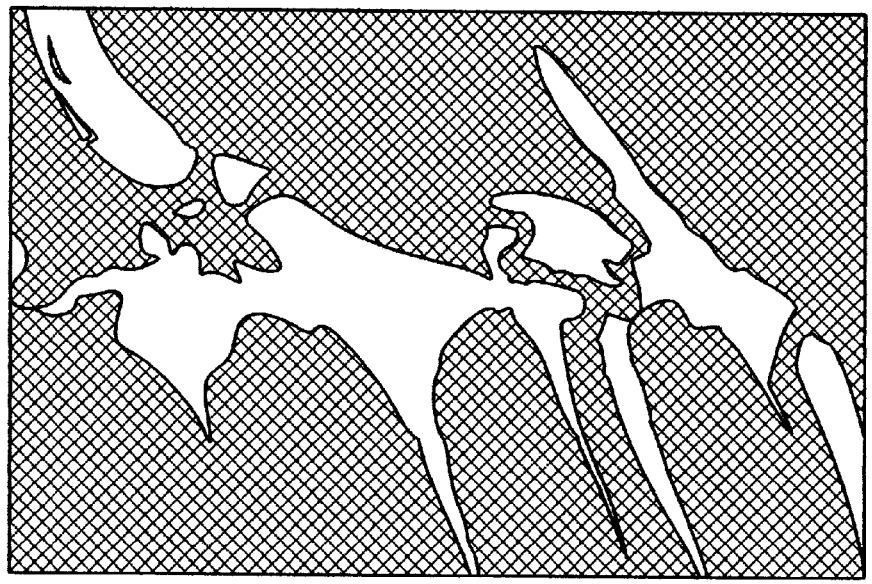
FIGS. 8, 9, and 10 are photomicrographs showing the failure mode of the wall of a pouch made according to the present invention and subjected to a vibration test. The flex line developing into the main axis of the crack is horizontal in each instance, and vertical cracks or strain lines extend vertically—perpendicular to the main axis of the crack.
Figure 9:
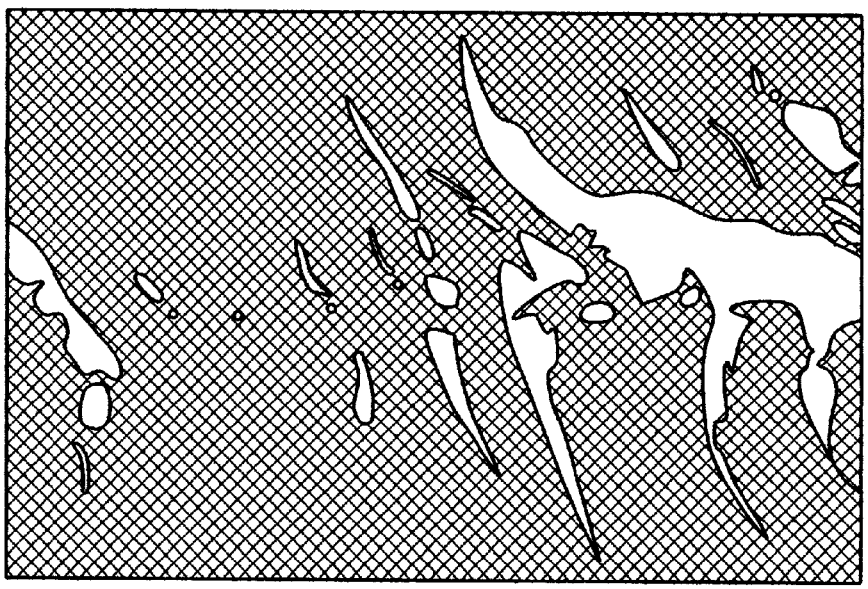
Figure 10:
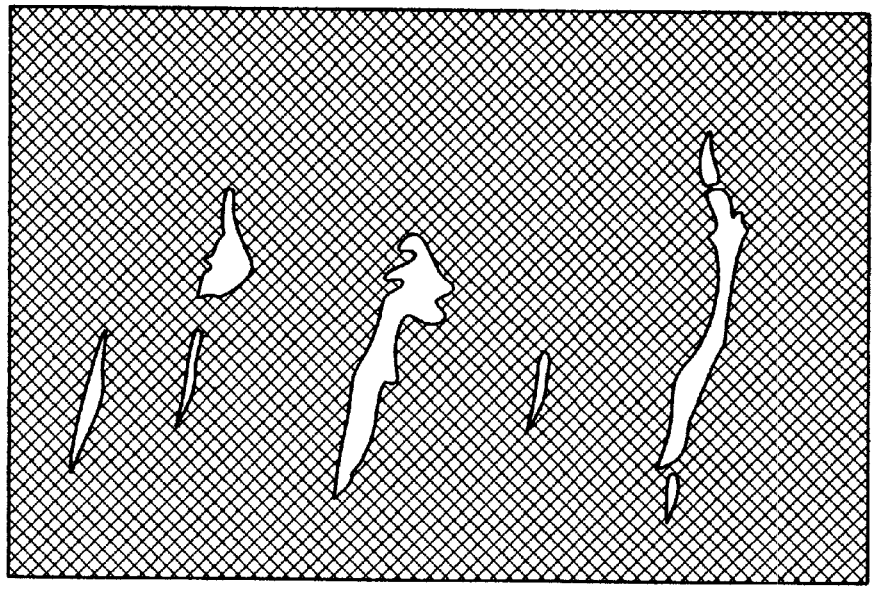

FIGS. 8–10 show the failure mode of the wall of a pouch made according to the present invention and subjected to vibration simulating truck transportation. In FIGS. 8–10, the film of the present invention fails between its seals to a substantial degree by cracking generally perpendicular to, as well as along, the horizontal flex line formed by the vibration. Instead of presenting merely one straight crack, one longer straight fold has a series of shorter cracks or strain lines extending both transversely and along the fold line.

Figure 11:
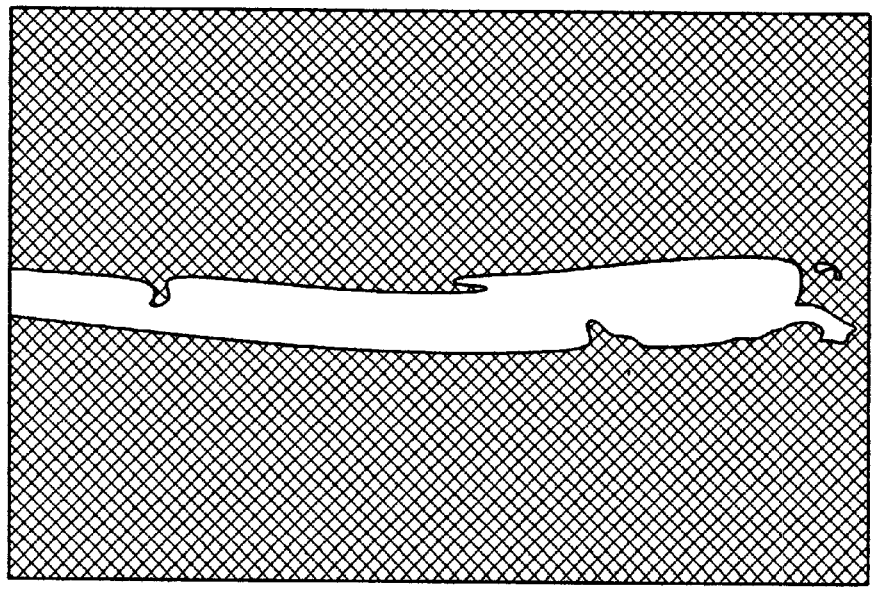
FIG. 11 is a view similar to FIGS. 8–10, showing the failure mode of the wall of a pouch, not made according to the present invention, when the pouch is subjected to a vibration test. In this instance, the crack forms cleanly without vertically radiating strain lines or cracks.

FIG. 11 is an enlarged view of the failure mode of the wall of a pouch made according to a comparative Example not within the present invention and subjected to the same type of vibration. FIG. 11 shows that the failed package wall of the comparative example appears as though it has been cleanly sliced, as by a razor. A clean slice is believed to be caused by fatigue cracking along a straight fold line where the film has been repetitively flexed.

This qualitative difference and the quantitative difference in failure rates suggests that the film according to the present invention is tougher and less prone to cracking than the comparative film which does not have a high-elongation layer.

EXAMPLES 1–2

Films according to the invention (Examples 1 and 3) and a film previously used commercially abroad (Example 2) were formed. Each film had a coextruded three-layer structure developed from a five-layer extruder.

For each example, two adjacent layers A and B, of which layer A was the outward-facing layer 14, each had the composition shown in Table 1. In Example 1, the layers A and B were 25 microns thick (counting both layers together) and together constituted 31.25% by thickness of the entire film. Two layers of identical composition were formed because the coextrusion equipment used was a five-layer coextruder and the film to be formed only required three different layers.

Two consecutive core layers C and D each had the composition shown in Table 1 in each example. The core layers C and D of Example 1 according to the present invention were 30 microns thick together, and constituted 37.5% by thickness of the film. Again, two layers of the same material were separately extruded only because the available extruder was a five-layer machine. The core layers of the other examples had about the same thickness.

The inward-facing layer 12, also identified as the product of extruder E, was a single layer having the composition for each example shown in Table 1. In Example 1, the inward-facing layer 12 was 25 microns thick, and amounted to 31.25% of the entire film in terms of thickness. The inward-facing layer 12 had the same thickness in the other Examples.

The entire five-layer film was 74 microns thick, was directly extruded and blown to form a film having a diameter of about 21.6 inches (54.8 cm). The properties of the resulting film are given in Table 2.

Next, the film was fabricated into water-filled, approximately one-liter (1060 g.) pouches on an ADVANTAGE packaging machine sold by TetraPak Flexible Packaging Systems, Lincolnshire, Ill. The pouch machine settings are provided in Table 3.

Finally, the pouches were tested; the test results are provided in Table 4. The number of leakers was evaluated at three different stages, as set out in Table 4.

The first stage of testing was to determine how many leakers were identified at the packaging machine, before any handling of the filled pouch. Leakers of this kind are conventionally identified and discarded in the packaging plant. Of 2250 pouches made in Example 1, according to the present invention, no leakers were identified, so the failure rate was zero. Of 2150 pouches made in Example 2, representing a pouch presently commercialized outside the United States, 2.14% (46) were leakers. Of 4500 pouches made in Example 3, 0.24% (11) were leakers. The pouches made according to Example 1, representing the present invention, thus were much less prone to immediate leakage than the pouches previously sold outside the United States.

Pouches representing each example were compression tested for leakage by compressing the liquid-filled, sealed pouches under controlled conditions simulating stacking.

To carry out a compression test, a load frame with a "compression chamber" attached was used. A suitable load frame is the MTS Sintech machine. The chamber contains two platens which are larger than the pouch major faces. The bottom platen is secured to the load frame base and remains stationary while the upper platen is secured to a load cell on a crosshead and is capable of moving vertically at a constant speed. The load frame must have a crosshead capable of maintaining a consistent speed. The load frame must also be equipped with a load cell which is rated for loads up to 1000 lbs. (453 kg). A sealed, clear polycarbonate chamber contains the compression platens and is secured to the load frame. The chamber has a drain spout on the bottom and the bottom platen is fitted with a nonskid surface.

A filled pouch which has been determined as a "non-leaker" as picked, and which is free from defects, is placed between the platens. The upper platen is then lowered until the pouch bursts or a predetermined force is reached without bursting. The proportion of pouches which burst is then reported.

Of the 100 pouches of Example 1 (the present invention) which were compression tested for leakage, none failed, yielding a failure rate of zero. In Example 2 (a previously known commercial package), 24 out of 50 pouches failed under the same test conditions, for a failure rate of 48%. The pouches of Example 1 were thus much less prone to leak than the prior non-United States commercial film of Example 2.

In another test, pouches according to each example were dropped 1.5 meters in a standard stair-step drop test, and the number of pouches which failed was evaluated. Out of 100 pouches of Example 1 according to the present invention dropped 1.5 meters, none failed. The 50% failure height for Example 1 was 4 meters or 13 feet.

Out of 50 pouches of Example 2, a prior commercial package outside the United States, 6% (3 pouches) failed the 1.5 meter drop test; The 50% failure height for Example 2 was 2.2 meters.

In these drop tests, therefore, the pouches of Example 1 were clearly superior to the packages of Example 2—a non-U.S. commercial pouch.

Finally, the pouches of each example were subjected to a Double-Stack Transport Test similar to the Standardized Transport Test. This test was carried out by stacking the pouches of each example in carriers, using conventional stacking machinery, and subjecting the carriers to vibration. The conditions were intended to simulate or exceed the amount and nature of vibration that normal pouches would experience during a roughly 1000 mile truck trip on medium to rough condition roads. This is regarded as a "torture test" designed to be much more stringent than usual commercial conditions, so statistically valid comparisons can be made with a relatively small number of samples.

For each test, 16 pouches made according to one of the examples were dropped by a conventional stacking machine into a suitable vertical-sided carrier, forming two shingled stacks of eight pouches per carrier. Five carriers were filled in this manner and stacked in two abutting vertical stacks. One stack of carriers was three carriers high, and the other was two carriers high. The stack of carriers was placed on a rotary or linear horizontal shaker table and shaken parallel to their longest dimension on a shaker table for 75 minutes at a rate of from about 205–216 cycles per minute. The pouches were then removed and evaluated for leakers, considering not only the number of leakers but the position of each leaker in the stack.

Of 80 pouches (i.e. the contents of two stacks of five carriers) made according to Example 1 and vibration-tested, about 8.75% (7 packages) failed. Of 80 of the prior commercial pouches according to Example 2 (the contents of a stack of five carriers), about 19% (15 packages) failed. Of 80 of the pouches according to Example 3, 15% (12 packages) failed.

The mode of vibration-induced failure in each instance was also noteworthy. The pouches at the tops of the stacks failed more frequently than the pouches at the bottom of the stack which are subject to more hydrostatic pressure. The pouches in the higher carriers of the stack of carriers were also somewhat more likely to fail. The pouch material failed more frequently than the seals. The inventors further observed that many of the top pouches failed on the top side which is not against any other pouches, or touched by anything else, in the usual course. The top pouches also failed more frequently on all sides than the pouches below.

Standardized Transport Test

To confirm these results and provide what is believed to be a better test of fatigue crack resistance, the Standardized Transport Test has been developed. That test is carried out as follows, conforming to the ASTM 999, Method A1, Repetitive Shock Test.

First, the appropriate shaking frequency and direction of the sample of the pouches to be tested are determined on other pouches of the same kinds by carrying out a preliminary test. Serenesima crates are filled with pouches on an automatic packing machine as previously described—sixteen pouches are packed in each Serenesima crate, laid with the plane defining the seals of each pouch roughly horizontal. One Serenesima crate is shaken horizontally by translating it back and forth in a direction parallel to the shorter dimension of each pouch (along the "x-axis"). Another single crate is shaken horizontally parallel to the longest dimension of each pouch (along the "y-axis"). A third single crate is shaken vertically (along the "z-axis" of each pouch). The harmonic frequency for shaking along each axis is determined by changing the shaking frequency in each test until a harmonic frequency, resulting in a greater amplitude of package motion than nearby frequencies, is observed. In tests with one-liter pouches presently of interest, the harmonic frequency is about 5 Hz (five cycles per second) when the packages are shaken along any of these three axes. Because more failures were initially observed due to shaking along the Y-axis (54.2%) than along the X-axis (52.1%) or Z-axis (8.3%), Y-axis shaking is adopted as the test of choice. The Y-axis dimension of the pouches happened to be the longest of the three dimensions in the present case. The inventors theorize that shaking the pouches parallel to their longest dimension will commonly be the most rigorous test.

To prepare for the main test, a large number of one-liter pouches are fabricated, filled with water at 15° C., sealed, refrigerated to 4° C., and held at 4° C. throughout the test. A sample of 576 intact pouches is randomly selected from this larger manufacturing run. Sixteen pouches are packed into each standard carrier—here, a Serenesima crate—then the Serenesima crates are stacked in a compact stack, with the Y-axis of each pouch aligned in the shaking direction. The stack is three Serenesima crates wide in the X-direction, four Serenesima crates deep in the Y-direction, and three Serenesima crates high in vertical stacks in the Z-direction. The Serenesima crates are abutted horizontally, interlocked vertically, and stacked on a shaker table, similar to the usual procedure for assembling a pallet load of pouches. The stack is then shaken by uniform, reciprocal, harmonic translational motion of the pallet parallel to its Y-axis on a Unholtz Dicke Model T 1000 linear-horizontal and vertical shaker table at a rate of 5 Hz.

The test is first run on a complete pallet load of 36 crates of control pouches, for long enough to cause 30–50% of the pouches to leak. In the present instance, the necessary time has been found to be 45 minutes. Test pallet loads are run under the same conditions. Each pallet load is then disassembled and each pouch is assessed for leakage by manually squeezing it to determine whether it leaks. The failure rate is then reported for each type of pouch, averaging over all of the pouches of the same kind.

EXAMPLES 4–13

The Standardized Transport Test was run on a series of different pouch materials having the compositions identified in Table 5. Unlike earlier examples, most of the pouches were single layer pouches.

In this instance, all the pouches in each vertical stack defining a Y-Z plane were made of the same material, but stacks made of different materials were in some instances placed in adjacent stacks in the X direction on a given pallet. Thus, in most cases some fraction of 576 pouches of a given material were tested.

Referring to Table 5, Examples 3 and 4 were carried out using the three layer material of Example 1, in two different film thicknesses. Example 5 was carried out using the three-layer material of Example 2. The results of Examples 3–5 are thus not directly comparable with the other results, which were carried out on uniform, monolayer films. Comparing Examples 3 and 4, however, the 80-micron three-layer film according to the present invention (Example 4—27% failure) again provided a lower failure rate than the comparative example (Example 5—38% failure).

Now consider Examples 6–13, which were carried out using monolayer films arranged in descending order of density. With one exception (Example 8—60% failure rate using a 100% LDPE pouch—versus Example 7—51% failure rate using an 80% MDPE pouch), the failure rate improved markedly as the density of the one-layer pouch material was decreased. The 100% low-density polyethylene (LDPE) of Example 8 led to a 60% failure rate. The mostly linear low-density polyethylene (LLDPE) material of Examples 9, 10, and 11, respectively made with different commercial sources of LLDPE, had failure rates of 14% to 27%. The mostly very low density polyethylene (VLDPE) materials of Examples 12 and 13 each had a 7% failure rate. Finally, Example 6 containing 80% high density material was unacceptable because this high-density material did not seal properly on the pouch forming machine.

EXAMPLES 14–17

Another series of examples like Examples 1–3 were carried out; the test conditions and results are reported in Tables 6–9 as Examples 14–17.

Conclusions From Testing

From these observations, the inventors have concluded that the failure of pouches in the vibration test, or during truck transportation of the pouches, is largely due to harmonic motion transmitted from the roads, through the truck structure, and into the liquid packed in the pouches. This induced vibration of the liquid contents flexes the package walls repeatedly, in much the same manner as the harmonic motion propagated in a old-style waterbed lacking baffles would flex the bed walls repeatedly. Thus, the walls which are more free to flex, such as the walls of the top pouches (which are under less hydrostatic pressure) and those not in contact with adjacent structure, are actually more likely to fail. Also, the pouches in a top carrier of a stack of carriers have somewhat more freedom to move than pouches in a lower carrier.

While not intending to be bound according to the accuracy of this theory, the inventors believe that certain changes to the pouch material which were previously contraindicated can be made to further reduce the number of vibration induced leakers. For example, instead of making the pouches more puncture resistant by stiffening their material, the pouches can be made more flexible by using more resilient materials or thinner film, and still reduce the number of leakers caused by vibration.

TABLE 1

Film Compositions

| Material | EXAMPLE (Percent by weight) | | |
|---|---|---|---|
| | 1 | 2 | 3 |
| PRINT LAYERS | | | |
| MDPE (0.939 g/cm$^3$) | — | — | 40% |
| LDPE (0.922 g/cm$^3$) | 50% | 54% | — |
| C$_4$-LLDPE (0.918 g/cm$^3$) | — | 25% | 39% |
| C$_8$-VLDPE (0.912 g/cm$^3$) | 30% | — | — |
| TiO$_2$/LDPE Masterbatch | 20% | 21% | 20% |
| anti-oxidant | — | — | 1% |
| CORE LAYERS | | | |
| MDPE (0.939 g/cm$^3$) | 40% | — | 40% |
| LDPE (0.922 g/cm$^3$) | — | 73% | — |
| C$_4$-LLDPE (0.918 g/cm$^3$) | 58% | 25% | 58% |
| Carbon Black/LDPE Masterbatch | 2% | 2% | 2% |
| SEAL LAYER | | | |
| EMA (0.94 g/cm$^3$) | — | — | 60% |
| LDPE (0.922 g/cm$^3$) | — | 60% | — |
| C$_4$-LLDPE (0.918 g/cm$^3$) | — | 25% | — |
| C$_8$-VLDPE (0.912 g/cm$^3$) | 40% | — | 20% |
| m-LLDPE (0.895 g/cm$^3$) | 40% | — | — |
| TiO$_2$/LDPE Masterbatch | 15% | 15% | 15% |
| Antiblock | 5% | — | 5% |

TABLE 2A

Film Properties

| Property | EXAMPLE | | |
|---|---|---|---|
| | 1 | 2 | 3 |
| FRICTION (COF) | | | |
| I/I Static | 0.796 | — | 0.984 |
| I/I Kinetic | 0.699 | — | 0.853 |
| I/M Static | 0.479 | — | 0.556 |
| I/M Kinetic | 0.432 | — | 0.535 |
| TENSILE (MD/TD) | | | |
| Yield MPA | 12/11 | 16/11 | 11/12 |
| Yield Elong % | 84/16 | 140/13 | 17/13 |
| Break MPA | 33/28 | 24/20 | 28/23 |
| Break Elong % | 710/750 | 490/700 | 726/699 |

TABLE 2A-continued

Film Properties

| Property | EXAMPLE | | |
|---|---|---|---|
| | 1 | 2 | 3 |
| MODULUS (MD/TD) | | | |
| SecMod 1% MPA | 227/241 | 215/235 | 254/296 |
| SecMod 2% MPA | 185/192 | 180/190 | 208/240 |
| PUNCTURE | | | |
| Break Load N | 15 | 12 | 14 |
| Energy to Brk J | 0.22 | 0.13 | 0.21 |
| Elong to Brk mm | 25 | 17 | 23 |
| Thickness mm | 0.074 | 0.074 | 0.08 |
| DROP IMPACT | | | |
| Fmax N | 65 | 69 | 61 |
| EFmax J | 0.46 | 0.51 | 0.32 |
| ETOT J | 0.53 | 0.66 | 0.59 |
| Vmax M/S | 3.17 | — | 3.2 |

TABLE 2B

Film Properties

| Property | EXAMPLE | | |
|---|---|---|---|
| | 1 | 2 | 3 |
| HEAT SEALS (LS/TS) | | | |
| Peak Load Gin | 2720/3560 | — | 2560/3120 |
| Energy In-Lb | 42/56 | — | 45/49 |
| UV % TRANSMISSION | | | |
| 400 nm | 0.02 | — | 0.12 |
| 500 nm | 1.00 | — | 1.35 |
| HOT TACK | | | |
| 90° C. | 2.68 | — | 1.31 |
| 100° C. | 3.32 | — | 1.66 |
| 110° C. | 3.42 | — | 2.28 |
| 120° C. | 3.04 | — | 2.98 |
| 130° C. | 2.64 | — | 2.71 |
| BURST TEST | | | |
| Fail Pressure PSI | — | — | — |
| ELMENDORF TEAR (MD/TD) | | | |
| Force (Gm) | — | — | — |

TABLE 3

Packaging Machine Conditions

| Condition | EXAMPLE | | |
|---|---|---|---|
| | 1 | 2 | 3 |
| Machine speed (pouches/hr) | 3120 | 3120 | 3120 |
| Lower seal time (milliseconds-"ms") | 275 | 275 | 275 |
| Lower seal pressure (Bar) | 3.25 | 3 | 3 |
| Lower seal temp., % | 66 | 79 | 57 |
| Lower seal coolant liters/min ("1/min") | 2 | 2 | 2 |
| Top seal time (ms) | 300 | 300 | 300 |
| Top seal pressure (Bar) | 2.1 | 2.1 | 2.1 |
| Top Seal Temp. (°C.) | 158 | 196 | 160 |
| Top Seal Coolant (1/min) | 1.5 | 1.5 | 1.5 |
| Top Seal Actual Zero | 66 | 68 | 68 |

TABLE 4

Pouch Test Results (Examples 1–2)

| Result | EXAMPLE | |
|---|---|---|
| | 1 | 2 |
| TAINER TEST | | |
| No. of pouches packed | 2250 | 2150 |
| No. of leakers (after holding overnight) | 0 | 46 |
| % leakers (after holding overnight) | 0 | 2.14 |
| TIGHTNESS TEST | | |
| No. of pouches tested | — | 50 |
| No. of failures | — | 24 |
| % failures | — | 48% |
| 1.5 METER DROP TEST | | |
| No. of pouches tested | 100 | 50 |
| No. of failures | 0 | 3 |
| % of failures | 0% | 6% |
| 50% FAILURE HEIGHT (m) | 4 | 2.2 |
| ONE-STACK TRANSPORTATION TEST | | |
| Shaker time (minutes) | 75 | 75 |
| Shaker rate (cycles/min.) | <--- 205–216 ---> | |
| No. of samples tested | 80 | 80 |
| No. of failures | 7 | 15 |
| % failures: | 8.75 | 18.75 |

TABLE 5

| Material | EXAMPLE (Percent by weight) | | | |
|---|---|---|---|---|
| | 3 | 4 | 5 | 6 |
| Same as Ex. 1 (3-layer) | 100 | 100 | — | — |
| Same as Ex. 2 (3-layer) | — | — | 100 | — |
| HDPE | — | — | — | 80 |
| MDPE | — | — | — | — |
| LDPE | — | — | — | 20 |
| LLDPE | — | — | — | — |
| VLDPE | — | — | — | — |
| Thickness (Microns) | 90 | 80 | 80 | 80 |
| % Failures: | 19 | 27 | 38 | * |

| Material | 7 | 8 | 9 | 10 |
|---|---|---|---|---|
| Same as Ex. 1 (3-layer) | — | — | — | — |
| Same as Ex. 2 (3-layer) | — | — | — | — |

TABLE 5-continued

| | | | | |
|---|---|---|---|---|
| HDPE | — | — | — | — |
| MDPE | 80 | — | — | — |
| LDPE | 20 | 100 | 20 | 20 |
| LLDPE | — | — | 80 | 80 |
| VLDPE | — | — | — | — |
| Thickness (Microns) | 80 | 80 | 80 | 80 |
| % Failures: | 51 | 60 | 14 | 25 |

| Material | 11 | 12 | 13 |
|---|---|---|---|
| Same as Ex. 1 (3-layer) | — | — | — |
| Same as Ex. 2 (3-layer) | — | — | — |
| HDPE | — | — | — |
| MDPE | — | — | — |
| LDPE | 20 | 20 | 20 |
| LLDPE | 80 | — | 0 |
| VLDPE | — | 80 | 80 |
| Thickness (Microns) | 80 | 80 | 80 |
| % Failures: | 27 | 7 | 7 |

*Material didn't seal on packaging machine, so was not tested.

TABLE 6

Film Compositions

| | EXAMPLE (Percent by weight) | | | |
|---|---|---|---|---|
| Material | 14 | 15 | 16 | 17 |
| PRINT LAYERS | | | | |
| MDPE (0.939 g/cm³) | — | 25.0 | — | — |
| LDPE (0.922 g/cm³) | 54.0 | 55.0 | 50.0 | 50.0 |
| C₄-LLDPE (0.918 g/cm³) | 25.0 | — | — | — |
| C₈-VLDPE (0.912 g/cm³) | — | — | 30.0 | 30.0 |
| TiO₂/LDPE Masterbatch | 20.0 | 20.0 | 20.0 | 20.0 |
| anti-oxidant | 1.0 | — | — | — |
| CORE LAYERS | | | | |
| MDPE (0.939 g/cm³) | 40.0 | 40.0 | 40.0 | 40.0 |
| LDPE (0.922 g/cm³) | — | — | — | — |
| C₄-LLDPE (0.918 g/cm³) | 58.0 | 58.0 | 58.0 | 58.0 |
| Carbon Black/LDPE Masterbatch | 2.0 | 2.0 | 2.0 | 2.0 |
| SEAL LAYER | | | | |
| EMA (0.94 g/cm³) | — | — | 60% | — |
| LDPE (0.922 g/cm³) | — | — | — | — |
| C₄-LLDPE (0.918 g/cm³) | — | — | — | — |
| C₈-VLDPE (0.912 g/cm³) | 80.0 | 60.0 | 20.0 | 60.0 |
| m-LLPDE (0.895 g/cm³) | — | 20.0 | — | 20.0 |
| TiO₂/LDPE Masterbatch | 15.0 | 15.0 | 15.0 | 15.0 |
| Antiblock | 5.0 | 5.0 | 5.0 | 5.0 |

TABLE 7A

| | EXAMPLE (Percent by weight) | | | |
|---|---|---|---|---|
| Material | 14 | 15 | 16 | 17 |
| COF | | | | |
| I/I Static | — | 0.688 | 0.988 | 0.598 |
| I/I Kinetic | — | 0.633 | 0.857 | 0.407 |
| I/M Static | — | 0.41 | 0.577 | 0.453 |
| I/M Kinetic | — | 0.393 | 0.551 | 0.377 |
| TENSILE (MD/TD) | | | | |
| Yield MPA | 12/12 | 11/12 | 12/11 | 12/11 |
| Yield Elong % | 74/14 | 10/16 | 79/16 | 74/16 |
| Break MPA | 32/29 | 31/26 | 25/24 | 34/29 |
| Break Elong % | 702/770 | 698/748 | 628/701 | 748/795 |
| MODULUS (MD/TD) | | | | |
| SecMod 1% MPA | 235/275 | 255/289 | 202/216 | 232/254 |
| SecMod 2% MPA | 190/220 | 207/233 | 173/184 | 186/203 |
| PUNCTURE | | | | |
| Break Load N | 12 | 15 | 16 | 16 |
| Energy to Brk J | 0.15 | 0.22 | 0.23 | 0.23 |
| Elong to Brk mm | 20 | 23 | 24 | 24 |
| Thickness mm | 0.071 | 0.0812 | 0.08 | 0.075 |
| DROP IMPACT | | | | |
| Fmax N | — | 59 | 66 | — |
| EFmax J | — | 0.51 | 0.54 | — |
| ETOT J | — | 0.65 | 0.76 | — |
| Vmax M/S | — | 3.2 | 3.18 | — |

TABLE 7B

| | EXAMPLE (Percent by weight) | | | |
|---|---|---|---|---|
| Material | 14 | 15 | 16 | 17 |
| Heat Seals (LS/TS) | | | | |
| Peak Load Gm | 2679/3046 | 2605/2895 | 2811/2995 | — |
| Energy In-Lb | 41/45 | 43/33 | 51/45 | — |
| UV% Transmission | | | | |
| 400 nm | — | 0.14 | 0.01 | 0.05 |
| 500 nm | — | 1.66 | 0.69 | 1.24 |
| Hot Tack | | | | |
| 90 C. | — | 2.02 | 1.57 | 1.82 |
| 100 C. | — | 3.31 | 1.73 | 2.17 |
| 110 C. | — | 3.56 | 1.59 | 2.44 |
| 120 C. | — | 3.34 | 1.61 | 2.95 |
| 130 C. | — | 3.05 | 1.50 | 2.9 |
| Burst Test | | | | |
| Fail Pressure PSI | 2.5 | 2.7 | 2.8 | — |
| Rate 6.0 PSI/MIN | — | — | — | — |
| Elmendorf Tear (MD/TD) | | | | |
| Force (Gm) | — | — | 742/>1584 | 774/>1584 |

TABLE 8

| Material | EXAMPLE (Percent by weight) | | | |
|---|---|---|---|---|
| | 14 | 15 | 16 | 17 |
| MACHINE SETTINGS | | | | |
| LS TIME (ms) | 275 | 275 | 285 | 275 |
| LS PRESSURE (Bar) | 3 | 3 | 3.1 | 3.1 |
| LS TEMP % | 58 | 57 | 72 | 70 |
| LS COOL (I/MIN) | 2 | 2 | 2 | 2 |
| TS TIME (MS) | 300 | 300 | 300 | 300 |
| TS PRESSURE (BAR) | 2.1 | 2.1 | 2.1 | 2.1 |
| TS TEMP (C.) | 166 | 162 | 160 | 160 |
| TS COOL (I/MIN) | 1.5 | 1.5 | 1.5 | 1.5 |
| TS ACTUAL ZERO | 66 | 68 | 68 | 66 |

TABLE 9

| Material | EXAMPLE (Percent by weight) | | | |
|---|---|---|---|---|
| | 14 | 15 | 16 | 17 |
| TAINER TEST | | | | |
| No. of pouches packed | 80 | 4500 | — | 150 |
| No. of leakers (after holding overnight) | 0 | 1 | — | 0 |
| % leakers (after holding overnight) | 0.00 | 0.02 | — | 0.00 |
| TIGHTNESS TEST | | | | |
| No. of pouches tested | 150 | 100 | — | 100 |
| No. of failures | 0 | 0 | — | 1 |
| % failures | 0 | 0 | — | 1 |
| 1.5 M DROP TEST | | | | |
| No. of pouches tested | — | 100 | — | — |
| # failures | 0 | 16 | — | — |
| % of failures | — | 16 | — | — |
| 50% FAILURES HEIGHT (m) | — | 2.2 | — | 2.8 |
| ONE-STACK TRANSPORTATION TEST | | | | |
| Shaker time (minutes) | 75 | 75 | — | 75 |
| SHAKER RATE | 205–216 | 205–216 | — | 205–216 |
| No. of samples tested | 80 | 80 | — | 80 |
| No. of failures | 25 | 27 | — | 7 |
| % failures | 31.25 | 33.75 | — | 8.75 |

What is claimed is:

1. A film having an average resin density of less that about 0.918 g/cm³ and comprising at least first and second polymeric layers, wherein at least one of said polymeric layers consists essentially of: from about 5% to about 95% by weight of a first polymeric material having an elongation at break of more than about 500% in the machine direction and more than about 600% in the transverse direction, when measured according to ASTM D-882, said first polymeric material having a density of at most about 0.914 g/cm³; and from 5% by weight to about 95% by weight of a second polymeric material having a density of at least about 0.915 g/cm³ and selected from the group consisting of polyethylene and ethylene copolymers, the film comprising at least 1% of said second polymeric material, characterized by having a lower probability of forming a vibration fatigue crack if:
   A. said film is formed into pouches;
   B. said pouches are packed with a liquid material;
   C. said packed pouches are formed into a stack of pouches; and
   D. said stack is exposed to material fatigue crack-inducing vibration;
than an otherwise-identical film wherein the layer corresponding to said second layer is made of said second polymeric material and free of said first polymeric material.

2. A polymeric film having an average resin density of less that about 0.918 g/cm³ and comprising at least first and second polymeric layers, wherein at least one of said polymeric layers consists essentially of:
   A. from about 5% to about 95% by weight of a first polymeric material comprising a very low density linear ethylene interpolymerized from ethylene and at least one alpha-olefin in the range of $C_3$–$C_{10}$ and having (1) a melt index of less than about 10.0 g/10 minutes and (2) (i) a hot tack or heat seal initiation temperature of less than 100° C. at a force of at least 1N/inch (39.4 N/m) or (ii) achieving a hot tack strength of at least 1N/inch (39.4N/m) at a seal bar temperature of about 110° C. at less than 0.2 seconds using the Hot Tack Strength Method or achieving a heat seal strength of at least 1 lbf/inch (175N/m) at a seal bar temperature of about 110° C. at less than 0.25 seconds using the Heat Seal Strength Method, the first polymeric material having an elongation at break of more than about 500% in the machine direction and more than about 600% in the transverse direction, when measured according to ASTM D-882, said first polymeric material having a density of at most about 0.914 g/cm³; and
   B. from 5% by weight to about 95% by weight of a second polymeric material having a density of at least about 0.915 g/cm³ and selected from the group consisting of polyethylene and ethylene copolymers.

3. The film of claim 2, wherein said first polymeric layer is adapted to form the interior surface of a pouch and said at least one polymeric layer is said second polymeric layer.

4. The film of claim 3, wherein said second polymeric layer is a print layer adapted to accept printing inks.

5. The film of claim 3, wherein said film has a thickness, said second polymeric layer has a thickness, and the thickness of said second polymeric layer is at most about 40% of the thickness of said film.

6. The film of claim 2, wherein said first polymeric material has a density of at most about 0.912 g/cm$^3$.

7. The film of claim 2, wherein said first polymeric material has a density of less than about 0.910 g/cm$^3$.

8. The film of claim 2, wherein said second polymeric material is selected from the group consisting of: very low density polyethylene; metallocenes; polybutylene rubber; and mixtures thereof.

9. A pouch made from the film of claim 2 and packed with a fluid material.

10. The pouch of claim 9 which has a Two-Stack Transport Test failure rate of less than about 18%.

11. A method of handling flowable material in pouches which reduces the probability of forming vibration material fatigue cracks in said pouches in the presence of material fatigue crack-inducing vibration, said method comprising the steps of:

A. providing the film of claim 1;

B. forming said film into individual pouches;

C. packing said pouches with a liquid material; and

D. forming said packed pouches into a stack.

12. The film of claim 3, wherein said second polymeric layer comprises less than about 20% by weight of said film.

13. A test method for evaluating liquid-filled pouches for leakers, comprising the steps of:

A. forming a stack of such pouches simulating how the pouches will be transported;

B. subjecting the stack to harmonic motion simulating the vibrations which will be experienced during transportation of the carrier; and C. evaluating the proportion of the pouches which develop leaks as the result of said vibrations.

* * * * *